July 14, 1925.　　　　　　　　　　1,546,106
R. RICE
VALVE
Filed July 12, 1920
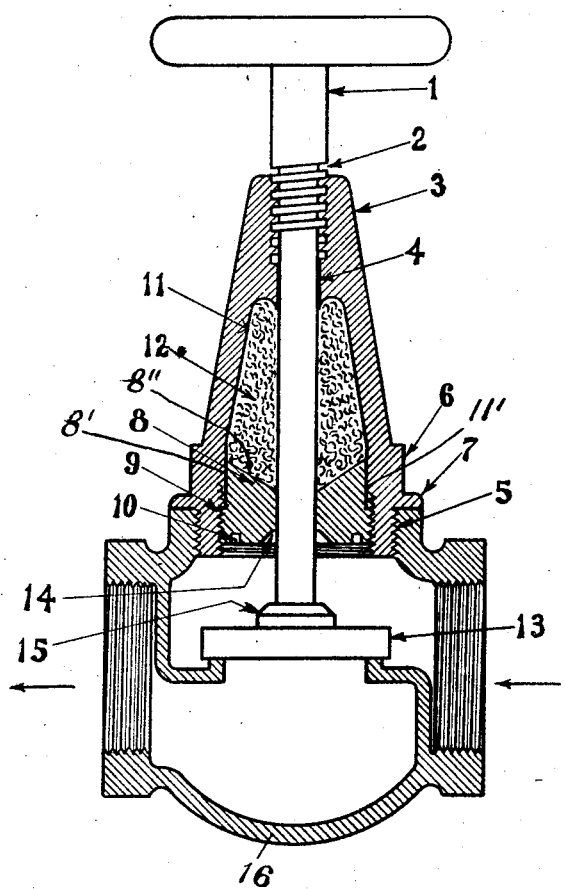

UNITED STATES PATENT OFFICE.

REECE RICE, OF INDIANAPOLIS, INDIANA, ASSIGNOR, BY MESNE ASSIGNMENTS, TO RICE IMPROVED VALVE & MANUFACTURING COMPANY, OF INDIANAPOLIS, INDIANA, A CORPORATION OF INDIANA.

VALVE.

Application filed July 12, 1920. Serial No. 395,546.

*To all whom it may concern:*

Be it known that I, REECE RICE, a citizen of the United States, residing at Indianapolis, in the county of Marion and State of Indiana, have invented certain new and useful Improvements in a Valve, of which the following is a specification.

The object of my invention is to produce a valve construction in which provision is made for the reception of a packing material for the stem entirely within the valve structure, as distinguished from the usual provision of packing receiving space accessible from the exterior, provision being made by which the packing material may be very closely associated with the valve stem.

The accompanying drawing, which is an axial section, illustrates my invention.

In the drawing, 16 indicates the main valve casing of ordinary construction and provided at one side with a threaded opening 5 for the reception of a suitably threaded inner end of a packing-receiving shell or supplemental casing 3 having a wrench receiving portion 6 and a flange 7 and which is axially bored at 4 and internally threaded to receive the threaded portion 2 of valve stem 1. The shell 3 is provided, at the inner end of bore 4, with a packing receiving chamber which gradually increases in diameter toward casing 16 so that the portion 11 thereof is a conical frustum, while the portion 11' is cylindrical. Beyond the portion 11', the wall of the chamber is internally threaded, at 9, to receive a gland 8 provided with sockets 10 to receive a suitable wrench and also provided with a conical seat 14 into which the shoulder 15 of the valve 13 may be seated when the valve is wide open. The gland 8, at its inner end is externally cylindrical as indicated at 8' so as to fit snugly into the cylindrical portion 11' of the packing receiving chamber, and is also preferably cupped at its inner end, as indicated at 8'', so that the packing 12 may be firmly compressed within the chamber substantially uniformly circumferentially and with gradually increasing density toward bore 4, this increase being due to the gradual tapering of the portion 11 of the chamber.

I find that by this peculiar formation of the packing receiving chamber, I am able to provide a packing which will withstand very high pressures and great variations in temperature.

I claim as my invention:

In a valve, the combination with a main body provided on one side with a threaded opening for the reception of a bonnet, of a unitary bonnet and stem comprising a shell threaded at one end to fit the threaded opening of the body and internally threaded at the opposite end to receive the threaded stem of a valve, said bonnet having an elongated packing receiving chamber between its threaded ends cylindrical at its inner end and gradually decreasing in diameter toward its outer end, a packing fitting within said chamber and a plug threaded into the inner end of said chamber provided with a cylindrical portion fitting the cylindrical portion of the chamber and having a substantially conical inner face arranged to engage the packing in said chamber and compress the same.

In testimony whereof, I affix my signature hereto.

REECE RICE.